United States Patent [19]

Ueda et al.

[11] Patent Number: 4,957,558
[45] Date of Patent: Sep. 18, 1990

[54] TEMPORARY SOLIDIFIER FOR PLAYING WITH SAND

[76] Inventors: Hiroshi Ueda; Tomonao Ueda, both of c/o Shinwa Industrial Co., Ltd., 3-16, Imai 3-Chome, Ome-Shi, Tokyo, Japan

[21] Appl. No.: 206,128

[22] Filed: Jun. 13, 1988

[30] Foreign Application Priority Data

Nov. 16, 1987 [JP] Japan .................................. 62-289023

[51] Int. Cl.⁵ ............................................... C08K 5/54
[52] U.S. Cl. .................................... 106/137; 106/148; 106/214; 106/157
[58] Field of Search .............. 106/213, 148, 900, 38.4, 106/38.51, 214, 157, 137

[56] References Cited

U.S. PATENT DOCUMENTS

| 2,360,828 | 10/1944 | Craig | 106/157 |
| 2,988,453 | 6/1961 | Hoglan | 106/38.51 |
| 3,544,345 | 12/1970 | Speakman | 106/157 |
| 3,891,580 | 6/1975 | Morris et al. | 428/511 |

Primary Examiner—Mark L. Bell
Assistant Examiner—Deborah Jones
Attorney, Agent, or Firm—Fred Philpitt

[57] ABSTRACT

A temporary solidifier for playing with sand or the like together with added water to form a work having a desired shape is disclosed. The temporary solidifier consists of a combination of adequate quantities of a glue and a revolsing enzyme and is added to the sand or the like.

4 Claims, 1 Drawing Sheet

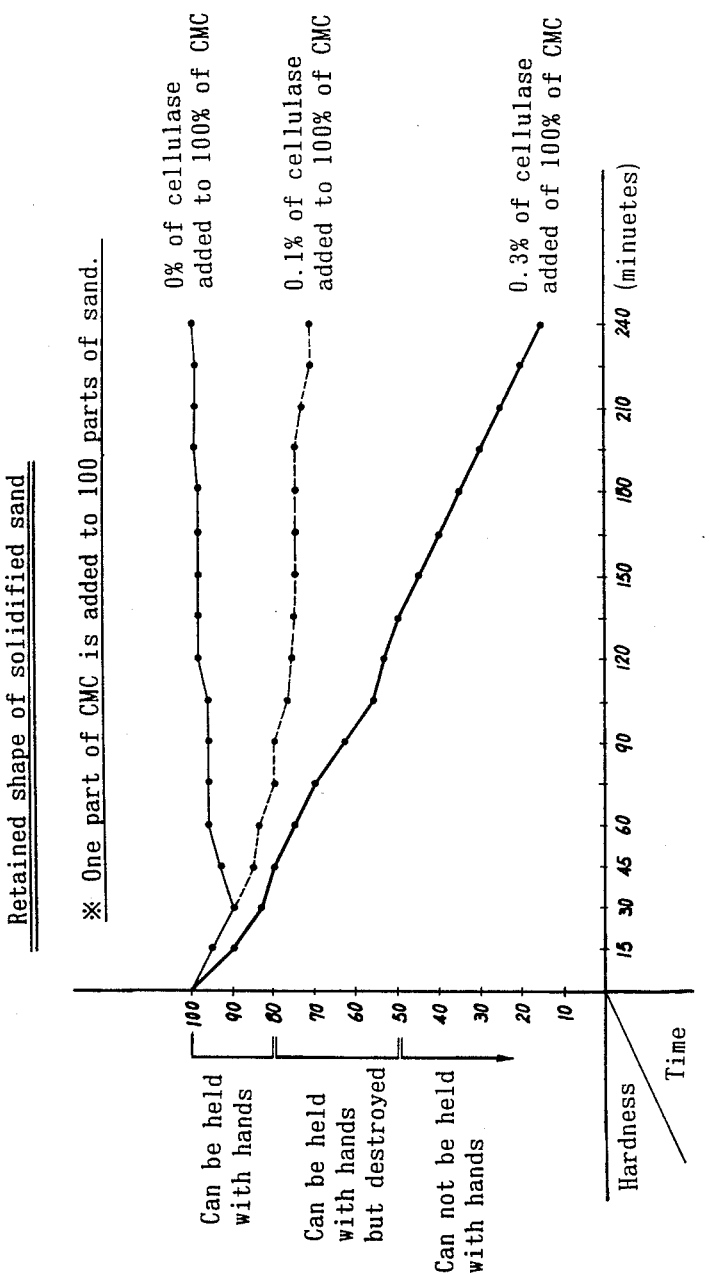

TEMPORARY SOLIDIFIER FOR PLAYING WITH SAND

BACKGROUND OF THE INVENTION

1. Field of the Invention

This invention relates to a temporary solidifier for playing with sand or the like by forming a work thereof in a solidified state having a desired shape. More particularly, the invention concerns a temporary solidifier for playing with sand, e.g., river sand, sea sand and mountain sand, or a material resembling sand, e.g., silica, glass beads and pulp particles, by forming a solidified work of sand or the like having a shape of a mountain, a vehicle, an animal, etc.

2. Prior Art

Playing with sand in a beach or in a sandbox is usually done by forming a solidified work of wet sand or sand wetted by adding water, the work having a shape of a mountain, a tunnel, a building, an animal or any other desired shape.

However, works of sand having been wetted in the form of a mountain, a tunnel, a building, a vehicle, an animal, etc. are easily destroyed with slight evaporation of water content or with application of a slight external force.

It is possible to use an adhesive or a sticky agent to solidify sand. However, such adhesive or sticky agent will cause skin irritation or pose other health problems. Besides, such adhesive or sticky agent is comparatively expensive. Moreover, such adhesive or sticky agent has a fatal drawback that it disables re-use of the sand once it has been incorporated.

SUMMARY OF THE INVENTION

In view of the above problems, the present invention seeks to provide a temporary solidifier, which can temporarily perfectly retain the shape of a sand work formed in playing with sand so that the work can be observed or recorded sufficiently, and also which permits original dry sand capable of re-use to be readily recovered after the lapse of a certain period of time.

To attain the above object of the invention, there is provided a temporary solidifier for playing with sand or the like together with added water to form a work having a desired shape, which temporary solidifier consists of an adequate quantity of a glue and a slight quantity of a resolving enzyme and is added to the sand or the like.

When sand is solidified by adding a suitable quantity of water and small quantities of glue and resolving enzyme, a thin film containing the glue is formed on the sand particle surface. The individual thin films are held together by the viscosity of the glue. This has an effect of retaining the shape of the sand work. After the lapse of a certain period of time, natural sticky polymers constituting the glue are decomposed by the action of the resolving enzyme. The glue thus becomes a low molecular substance. The sand work thus is eventually destroyed, and original dry sand can be recovered.

BRIEF DESCRIPTION OF THE DRAWING

FIG. 1 is a graph showing experimental data obtained by using the temporary solidifier according to the invention.

DETAILED DESCRIPTION OF THE PREFERRED EMBODIMENTS

Now, preferred embodiments of the invention will be described with reference to the accompanying drawing.

To a predetermined quantity of sand were added an adequate quantity of water conforming to the water content of the sand, a small quantity of a glue and a slight quantity of a resolving enzyme, and the resultant system was solidified in a cubic sand mold. The mold with the solidified sand was then placed on a plate and separated from the cubic sand work on the plate.

The sand used may be river sand, sea sand or mountain sand. It may contain small quantities of mud, salt, etc.

It is possible to use silica, glass beads, pulp particles, etc. in lieu of sand.

The glue used is suitably water-soluble. Its examples are such plant glues as CMC (sodium grycolate cellulose), MC (methyl cellolose) and processed starch and such animal glues as casein and gelatin.

In view of the function and economy, the glue is suitably added by 0.5 to 3% with respect to sand in case of CMC and MC and about 10% with respect to sand in case of processed starch.

The enzyme which is used for decomposing the glue may be cellulase, amilase ($\alpha$-amilase), protease, etc., and it is selected in dependence on the glue used.

Suitable combinations of the glue and resolving enzyme are as in the Table below.

|        | Glue             | Resolving enzyme |
| ------ | ---------------- | ---------------- |
| Plant  | CMC              | Cellulase        |
|        | MC               | Cellulase        |
|        | Processed starch | $\alpha$-amilase |
| Animal | Casein           | Protease         |
|        | Gelatin          | Protease         |

In view of the function and economy, the resolving enzyme is suitably added by 0.001 to 0.005% with respect to the glue when CMC or MC is used as glue and 2% with respect to the glue when processed starch is used.

An example of experiment conducted by using CMC as glue and cellulase as resolving enzyme will now be described.

To 100% of river sand were added 1% of CMC, a slight quantity of cellulase and an adequate quantity of water. Cellulase, more specifically, was added by 0, 0.001 and 0.003% with respect to the glue. The resultant systems were solidified in a cubic sand mold. Each sand cube thus formed was placed on a plate and examined by touching it with a hand for every hour.

Results obtained are as follows.

In case of 0% cellulase:

After one, two, three and four hours, the cubic shape was retained when the work was held with hands.

In case of 0.001% cellulase:

Before the lapse of one hour, the cubic shape was retained when the work was held with hands.

After two, three and four hours, the work was partly destroyed when it was held with hands.

In case of 0.003% cellulase:

After one and two hours, many work samples were partly destroyed although they could be held with hands.

After three and four hours, no work sample could be held with hands, but all work samples were destroyed when they were touched slightly.

The graph of FIG. 1 shows the results as described above.

The shape of the sand cubes formed in the manner as described above is retained by the viscosity of CMC, which is obtained by reacting monochloroacetic acid with alkalicellulose and partly substituting carboxymethyl groups for hydroxyl groups of cellulose. With the lapse of time, however, cellulase, which causes hydrolysis of cellulose present in plant's cellular membrane, eventually becomes active to cause decomposition of the glue. The glue thus becomes low molecular (i.e., its viscosity is reduced), so that the sand work is destroyed.

The occurrence of destruction of the work is delayed in inverse proportion to the quantity of resolving enzyme used.

As has been described in the foregoing, the temporary solidifier for playing with sand according to the invention consists of a combination of a glue capable of solidifying sand or the like and a slight quantity of resolving enzyme for decomposing sticky molecules of the glue to reduce the viscosity thereof. Thus, sand works in the form of a mountain, a tunnel formed therein, a building, an animal, etc. can perfectly retain their shape in inverse proportion to the quantity of resolving enzyme used. The works thus can be sufficiently observed or recorded. Further, after the lapse of a predetermined period of time the sticky molecules in the glue are perfectly decomposed by the resolving enzyme, so that dry original sand can be recovered for re-use.

Furthermore, the glue and resolving enzyme have no adverse effects on the skin, that is, they never cause skin irritation and never pose any other health problem or any polution problem.

What is claimed is:

1. A solidified work having a shape and composed of silica or sand that is held together by a suitable quantity of water and a small quantity of an adhesive, the improvement comprising that said solidified work also includes a resolving enzyme in an amount sufficient to decompose the adhesive.

2. A solidified work according to claim 1 wherein said enzyme is selected from the group consisting of cellulase, amylase and protease.

3. A solidified work according to claim 1 wherein the amount of enzyme is between 0.001 and 2 wt.% on the weight of the glue.

4. A solidified work according to claim 2 wherein the amount of enzyme is between 0.001 and 2 wt.% based on the weight of the glue.

* * * * *